UNITED STATES PATENT OFFICE.

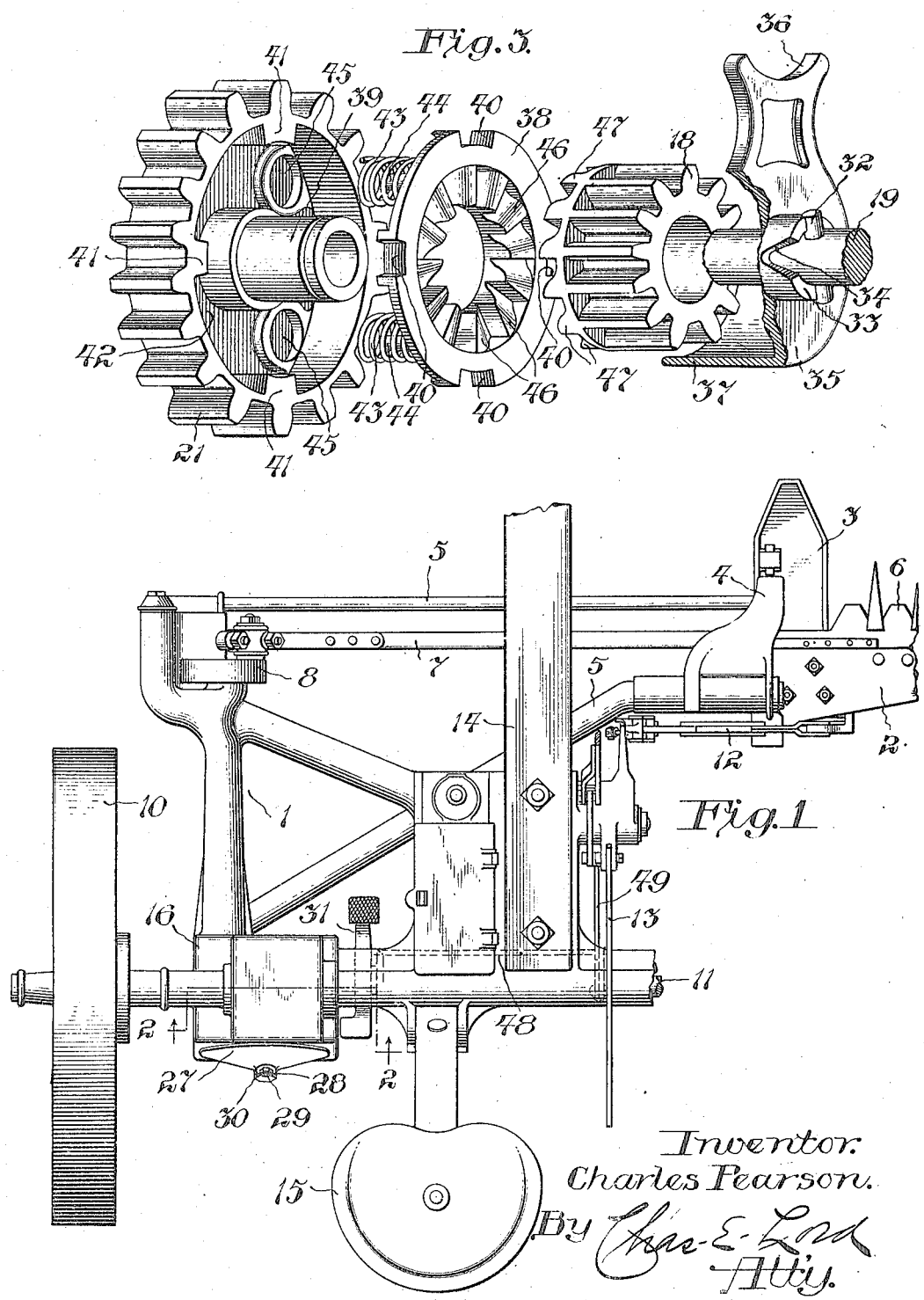

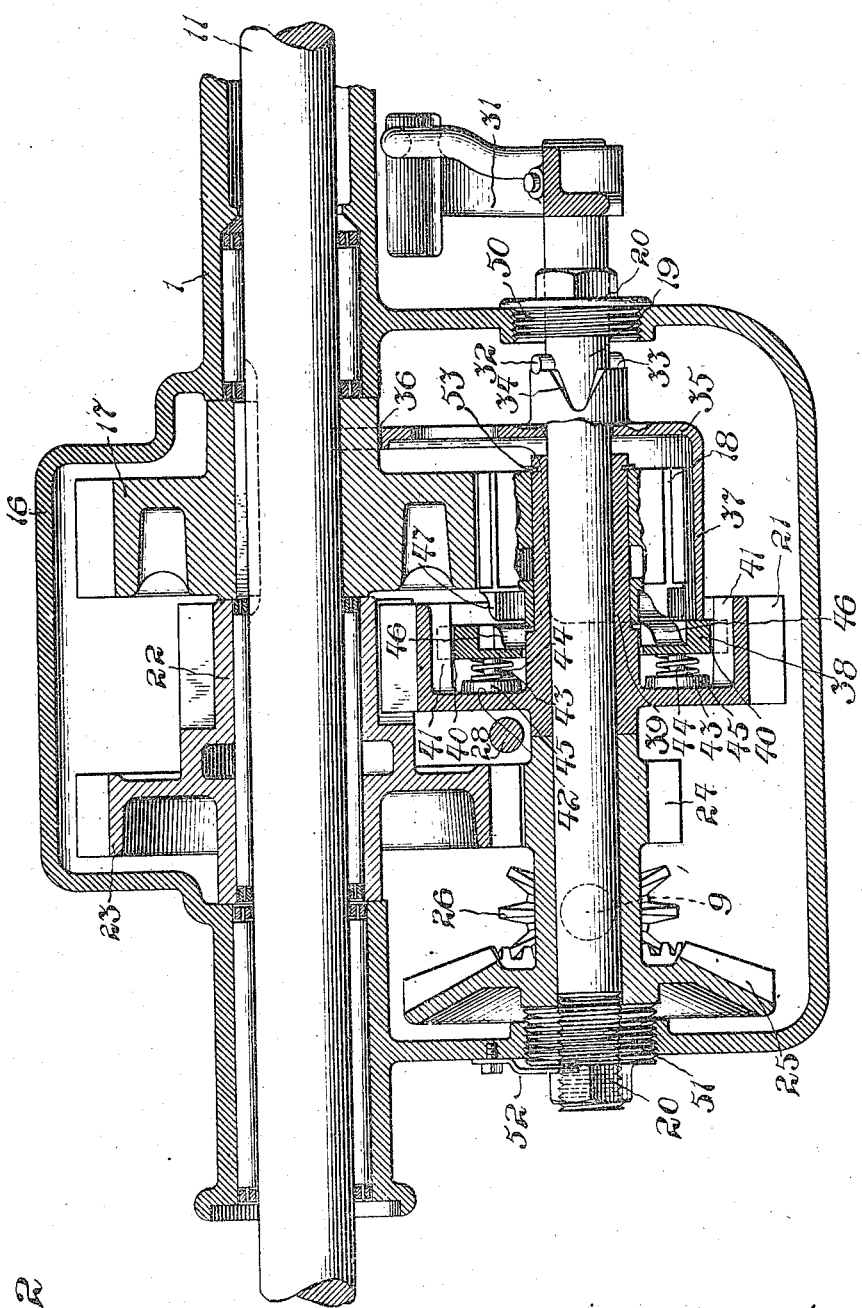

CHARLES PEARSON, OF CHICAGO, ILLINOIS, ASSIGNOR TO INTERNATIONAL HARVESTER COMPANY OF NEW JERSEY, A CORPORATION OF NEW JERSEY.

GEARING FOR MOWERS.

1,233,397.　　　　Specification of Letters Patent.　　Patented July 17, 1917.

Application filed January 31, 1916. Serial No. 75,387.

*To all whom it may concern:*

Be it known that I, CHARLES PEARSON, a citizen of the United States, residing at Chicago, in the county of Cook and State of Illinois, have invented certain new and useful Improvements in Gearing for Mowers, of which the following is a full, clear, and exact specification.

My invention relates to mowers. It has among its objects to provide an improved driving connection between the axle and the crank shaft of a mower which is simple and compact in construction, which is practically noiseless in operation, and which is adapted to long wear in service without the necessity for frequent oiling of its parts. A further object of my invention is to provide a clutch mechanism controlling the connection of the driving parts and improved means for controlling the clutch. I attain these objects by an improved construction and arrangement of driving mechanism carried and housed in an improved manner on the mower frame and controlled by clutch mechanism as hereinafter described.

In the accompanying drawings I have, for purposes of illustration, shown one embodiment which my invention may assume in practice.

In these drawings:

Figure 1 is a partial plan view of a mower equipped with my improvement;

Fig. 2 is a transverse sectional view, taken substantially on line 2—2 of Fig. 1, looking in the direction of the arrows;

Fig. 3 is a view showing the clutch controlling parts in perspective.

The mower shown is of standard construction, including a frame 1 having a finger bar 2 secured to a shoe 3, which is hingedly connected with a yoke 4 carried on one end of a rising and falling coupling bar 5, having its opposite end pivotally connected with the frame 1, a knife 6 being carried in the finger bar and operated through a pitman 7 from a crank disk 8 connected to the crank shaft 9 of the mower. As in the usual construction, the frame 1 is carried by traction wheels 10 mounted upon opposite ends of an axle 11, and flexible operative connections 12 are provided between the finger bar 2 and coupling bar 5, and an operating lever 13 carried on the frame, so that the position of the finger bar may be adjusted as desired, the lever 13 preferably being mounted at one side of the pole 14 and at the front and right of a seat 15.

In my improved construction the frame 1 of the mower is provided with a casing 16 preferably formed integral therewith and including a portion extending above the axle and a communicating relatively larger portion extending downward beneath the axle, the lower portion being substantially rectangular in cross section, as shown. Through the smaller portion of this casing extends the shaft 11, which is journaled at its ends in the frame 1, and keyed to the shaft within the casing is a spur gear 17 which is constantly rotated with the shaft as the wheels 10 are rotated. Meshing with the gear 17 is a second smaller spur gear 18 journaled on a sleeve member 39 journaled upon a short cross shaft 19 disposed parallel to the shaft 11 and directly beneath the same, which shaft is journaled in bearing members 50 and 51 threaded in openings in the end walls of the bottom portion of the casing at its right and left-hand sides, respectively, as shown in Fig. 2, provided with boss members 20 and forming bushings for opposite ends of the shaft. The gear 18 is connectible through clutch connections, hereinafter described, with a second larger gear 21 integral with the sleeve 39 journaled on the shaft 19 at the stubbleward side of the gear 18. This gear 21 in turn meshes with a smaller gear 22 journaled on the shaft 11 at the stubbleward side of the gear 17 and is preferably formed integral with a second larger gear 23 disposed at the stubbleward side thereof and in turn meshing with a smaller gear 24 journaled on the shaft 19 at the stubbleward side of the gear 21, this gear 24 preferably being formed integral with a bevel gear 25 meshing with a small bevel gear 26 on the crank shaft 9 which extends into the casing 16 and is extended forward in a longitudinal direction as in the usual construction. The hub of the bevel gear 25 abuts the inner ends of the threaded bearing member 51 in a manner whereby the pinion 25 may be adjusted longitudinally to cause it to mesh properly with the pinion 26, and 52 represents a nut lock secured to the casing and engaging with the nut 20.

In my improved construction it will be noted that the several gears constituting the driving connections between the axle 11 and crank shaft 9 are very compactly arranged and that they provide an efficient means for producing the desired rotation of the shaft 9 from the axle 11. Further, it will be noted that these gears are all inclosed in a single casing 16 so that they may run in oil, the casing preferably being supplied with sufficient oil to submerge the shaft 19. In order that ready access may be had to the gears, it will also be noted that a removable plate 27 is disposed at the rear end of the casing and attached thereto by means of a bolt 28, extending through the casing, and nut 29, an oil opening being provided, preferably beneath the nut, and having a removable cap 30 so that oil may, if desired, be supplied to the casing without removing the plate 27.

By my improved construction of clutch mechanism and clutch controlling mechanism, the driving mechanism above described is controllable from the exterior of the casing in a very convenient manner. As shown, this mechanism includes a clutch operated bell crank 31 fixed to the grassward end of the shaft 19 at a point without the casing and having foot lever arms disposed beneath and extending on opposite sides of the axle 11, which are readily operable by the operator when seated on the seat 15. Also carried on this shaft 19, and within the casing, is a pin 32 engageable with the end wall 33 and a notch 34 in a sliding clutch controlling member 35 having one arm extending upward and recessed at 36 to provide a guide therefor on the hub of the gear 17 and the other arm extending downward and then stubblewardly, as shown at 37, to enable it to engage with the flat surface of a ratchet carrying ring 38, which is disposed between the gears 21 and 18 and mounted for rotation with the gear 21. As shown, this member 38 is provided with a plurality of outer radially disposed notches 40 receiving lugs 41 on the inner wall of a recess 42 in the grassward face of the gear 21, the lugs 41 and notches 40 acting to lock the parts against relative rotation and permit a sliding movement of the ring 38 longitudinally of the axis of the shaft 19. Coiled springs 43, carried on studs 44 on the stubbleward face of the member 38 are receivable in suitable seats 45 in the grassward face of the gear 21, these springs normally acting to hold the member 38 outward in projected position in the recess 42 so that a plurality of ratchet teeth 46 formed on the grassward face of the member 38, and interiorly of the outer ring portion thereof, may engage with coöperating ratchet teeth 47 formed on the stubbleward face of the gear 18.

In the operation of my improved mechanism it is obvious that as the wheels 10 of the mower rotate, the gear 17 will be constantly rotated and that the gear 18 will be constantly rotated therewith. When the clutch mechanism is disconnected, as shown in Fig. 2, wherein the clutch controlling member 37 is moved into such a position as to hold the teeth 46 on the member 38 out of engagement with the teeth 47 on the gear 18, obviously the rotation of these two gears will not impart rotation to the gear 26 on the crank shaft. When, however, it is desired to operate the knife 6, this is readily accomplished by simply throwing the clutch controlling member 31 about its pivot from the position shown in Fig. 2 so that the pin 32 on the shaft 19 may be seated in the notch 34, whereupon, through the action of the springs 43, the member 38 will be so reciprocated grasswardly as to move its ratchet teeth 46 into driving relation with the teeth 47 on the gear 18, a split washer 53, received by a peripheral groove around the extended end of the sleeve 39, preventing a lateral movement of the spur gear 18. When this occurs the rotation of the gear 17 will be transmitted to the gear 18 and from that gear transmitted to the gear 21, and through the gears 22, 23, 24, 25 and 26 to the crank shaft 9.

In the use of my improved mechanism it has been found that after the casing has once been filled with oil it does not need attention on the part of the operator for a long period, one filling in most cases being sufficient for a season, so that all difficulty in connection with wearing out of the driving connections on account of the failure of careless operators to oil the same is eliminated. It has further been found that the mechanism is practically noiseless and that the wearing qualities of the same are good. It is also obvious that the operating connections for the clutch mechanism are very conveniently located to the operator.

In the operation of the machine it is, of course, obvious that when the same is applied to a vertical lift mower, as shown herein, the controlling member 31 may be connected through a suitable crank 48 with a link 49 connected to the adjusting mechanism for the finger bar 2, so that the clutch mechanism may be thrown in and out during the lifting of the bar in accordance with the well-known requirements of vertical lift mowers.

While I have in this application specifically described one embodiment which my invention may assume in practice, it is to be understood that the form shown herein is used for purposes of illustration, and that the same may be modified and embodied in other forms without departing from its spirit, it being my intention to include all such modifications within the scope of the appended claims.

What I claim as my invention, and desire to secure by Letters Patent, is:

1. In a mower gearing, a drive shaft, fast and loose gearing thereon disposed side by side, said loose gearing comprising a plurality of gears, a supplemental shaft disposed parallel to said drive shaft, a rotatable gear thereon engaging with the fast gear on said driving shaft, a second freely rotatable gear engaging with one of the loose gears on said driving shaft, clutch mechanism including a reciprocable member interposed between the rotatable gears on said supplemental shaft rotatably engaged by one of said gears and intermittently engageable with the other of said gears, a plurality of loosely mounted gears carried on said supplemental shaft, a crank shaft, and a gear carried thereon engaging with one of said plurality of gears, the other engaging with the other loose gear on said driving shaft.

2. In a mower gearing, a drive shaft, fast and loose gearing thereon disposed side by side, said loose gearing comprising a plurality of gears, a supplemental shaft disposed parallel to said drive shaft, a rotatable gear thereon engaging with the fast gear on said driving shaft, a second freely rotatable gear engaging with one of the loose gears on said driving shaft, means including a reciprocable disk for intermittently connecting said freely rotatable gears, a plurality of loosely mounted gears carried on said supplemental shaft, a crank shaft, a gear carried thereon engaging with one of said plurality of gears, the other engaging with the other loose gear on said driving shaft, and an oil-tight casing inclosing said gearing, and means operable from the exterior of said casing for reciprocating said disk.

3. In a mower gearing, a drive shaft, fast and loose gearing thereon disposed side by side, said loose gearing comprising a plurality of gears, a supplemental shaft disposed parallel to said drive shaft, a rotatable gear thereon engaging with the fast gear on said driving shaft, a second freely rotatable gear engaging with one of the loose gears on said driving shaft, a plurality of loosely mounted gears carried on said supplemental shaft, a crank shaft, a gear carried thereon engaging with one of said plurality of gears, the other engaging with the other loose gear on said driving shaft, an oil-tight casing inclosing said gearing, and reciprocable clutch mechanism operable from the exterior of the casing controlling the connection of the gear on said crank shaft to said driving shaft.

4. In a mower gearing, a drive shaft, fast and loose gearing thereon disposed side by side, said loose gearing comprising a plurality of gears, a supplemental shaft disposed parallel to said drive shaft, a rotatable gear thereon engaging with the fast gear on said driving shaft, a second freely rotatable gear engaging with one of the loose gears on said driving shaft, a plurality of loosely mounted gears carried on said supplemental shaft, a crank shaft, a casing inclosing said gearing and a clutch mechanism operable from the exterior of said casing controlling the connection between the first and second freely rotatable gears on said supplemental shaft.

5. In a mower gearing, a driving shaft, a gear fixed thereto, a supplemental shaft disposed parallel to and beneath said driving shaft, a gear rotatable on said supplemental shaft, a coöperating gear disposed adjacent said last mentioned gear, clutch mechanism between said gears, including a reciprocable disk rotatably engaged with one of said gears and intermittently engageable with the other of said gears, a gear on said driving shaft meshing with said coöperating gear, a gear on said driving shaft rotatable with said last mentioned gear thereon, a gear on said supplemental shaft meshing with the last mentioned gear on said driving shaft, a bevel gear rotatable with the last mentioned gear on said supplemental shaft, a crank shaft disposed at right angles to said shafts, and a bevel gear thereon engageable with the bevel gear on said supplemental shaft.

6. In a mower gearing, a driving shaft, a supplemental shaft, a crank shaft, gearing carried by said driving shaft and meshing with gearing journaled upon said supplemental shaft including a driving pinion meshing with a pinion secured to said crank shaft, an oil-tight casing inclosing said gearing, a longitudinally adjustable bearing member mounted upon said casing and abutting said driving pinion and receiving one end of said supplemental shaft whereby said pinion may be adjusted relative to the pinion on said countershaft.

7. In a mower gearing, a driving shaft, a supplemental shaft, a crank shaft, gearing carried by said driving shaft and meshing with gearing journaled upon said supplemental shaft including a driving pinion meshing with a pinion secured to said crank shaft, an oil-tight casing inclosing said gearing, and a longitudinally adjustable bearing member threaded in the wall of said casing and having one end abutting said driving pinion and axially receiving a threaded end of said supplemental shaft whereby said pinion may be adjusted relative to the pinion on said countershaft.

8. In a mower gearing, a driving shaft, having a driving gear mounted thereon, a rock shaft disposed parallel with said driving shaft, a gear wheel journaled upon said rock shaft, a spring-pressed toothed clutch disk slidably mounted upon said gear wheel, and non-rotatable with respect thereto, said wheel having a laterally extending journal sleeve, a pinion journaled upon said sleeve meshing with the gear on said driving shaft and provided with clutch teeth adapted to engage with said clutch disk, said sleeve being provided with a circumferential channel, and a split washer received by said channel and retaining said pinion in operative position upon said sleeve.

9. In a mower gearing, a driving shaft, having a driving gear mounted thereon, a rock shaft disposed parallel with said driving shaft, a gear wheel journaled upon said rock shaft, a spring-pressed toothed clutch disk slidably mounted upon said gear wheel, and non-rotatable with respect thereto, said wheel having a laterally extending journal sleeve, a pinion journaled upon said sleeve meshing with the gear on said driving shaft and provided with clutch teeth adapted to engage with said clutch disk, said sleeve being provided with a circumferential channel, a split washer received by said channel and retaining said pinion in operative position upon said sleeve, a clutch shipping cam slidably mounted upon said rock shaft and engaging with said clutch disk, a pin carried by said rock shaft and engaging with said cam, and means for turning said rock shaft axially to control the clutch mechanism.

10. In a gearing for mowers or the like, a drive shaft, a driving gear fixed thereon, a supplemental shaft, a freely rotatable gear thereon engaging with said driving gear, a second gear loosely mounted on said supplemental shaft, clutch mechanism carried by said shaft, rotatable with said loosely mounted gear and intermittently engageable with said freely rotatable gear, a clutch controlling member carried by said supplemental shaft, and means actuated by the rotation of said shaft for operating said clutch controlling member.

11. In a gearing for mowers or the like, a drive shaft, a driving gear secured thereto, a supplemental shaft, a freely rotatable gear thereon engaging with said driving gear, a second gear loosely mounted on said supplemental shaft, reciprocable clutch mechanism carried by said shaft, rotatable with said loosely mounted gear, engageable with said freely rotatable gear and interposed between said gears, a reciprocable clutch controlling member carried by said supplemental shaft, and means actuated by the rotation of said shaft for reciprocating said clutch controlling member.

12. In a gearing for mowers or the like, a drive shaft, a driving gearing fixed thereon, a supplemental shaft, a freely rotatable gear thereon engaging said driving gear, a second gear loosely mounted on said supplemental shaft, clutch mechanism carried by said shaft, rotatable with said loosely mounted gear and intermittently engageable with said freely rotatable gear, a clutch controlling member carried by said supplemental shaft, a casing inclosing said gearing and clutch mechanism, and means operable from the exterior of the casing for actuating said clutch controlling member.

13. In a gearing for mowers or the like, a drive shaft, a driving gear fixed thereon, a supplemental shaft, a freely rotatable gear thereon engaging said driving gear, a second gear loosely mounted on said supplemental shaft, reciprocable clutch mechanism carried by said shaft, rotatable with said loosely mounted gear and intermittently engageable with said freely rotatable gear, resilient means interposed between said loosely mounted gear and said clutch mechanism for normally forcing the clutch mechanism into engagement with said freely rotatable gear, and means carried by said supplemental shaft and actuated upon rotation thereof for forcing said clutch mechanism out of engagement with said freely rotatable gear.

In testimony whereof I affix my signature.

CHARLES PEARSON.

Copies of this patent may be obtained for five cents each, by addressing the "Commissioner of Patents, Washington, D. C."